May 28, 1935.  E. MENDENHALL ET AL  2,002,912
CONTROL DEVICE FOR PUMPING SYSTEMS
Filed March 23, 1931  2 Sheets-Sheet 1

INVENTORS:
EARL MENDENHALL,
JUNIUS B. VAN HORN
BY
ATTORNEY.

May 28, 1935.  E. MENDENHALL ET AL  2,002,912
CONTROL DEVICE FOR PUMPING SYSTEMS
Filed March 23, 1931  2 Sheets-Sheet 2
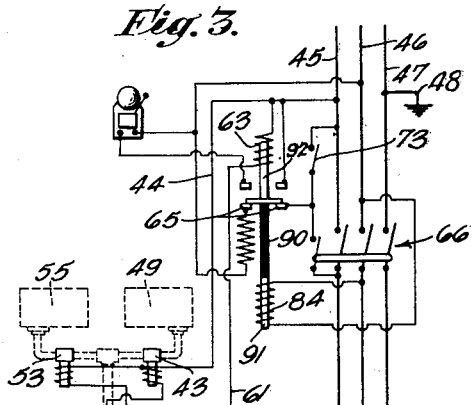
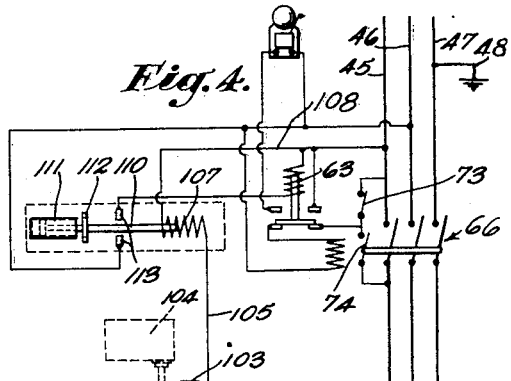
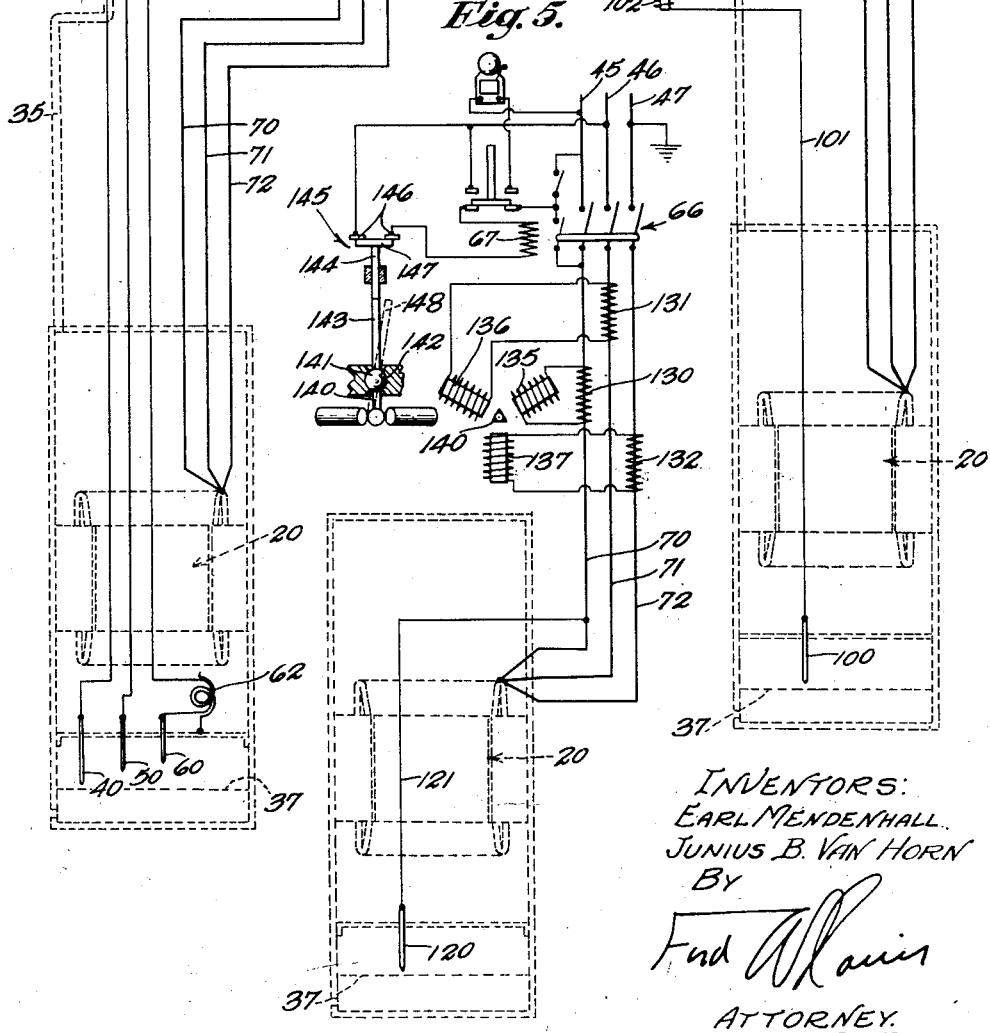
INVENTORS:
EARL MENDENHALL
JUNIUS B. VAN HORN
BY
ATTORNEY.

Patented May 28, 1935

2,002,912

UNITED STATES PATENT OFFICE 2,002,912

CONTROL DEVICE FOR PUMPING SYSTEMS

Earl Mendenhall and Junius B. Van Horn, Los Angeles, Calif., assignors to Menhorn, Inc., Los Angeles, Calif., a corporation of California Application March 23, 1931, Serial No. 524,494

28 Claims. (Cl. 172—36)

Our invention relates to motors of the submersible type, it being an important object of the present invention to provide a novel control system acting as a safety device to insure that the external fluid in which the motor is submerged shall not come in contact with the windings of the motor in sufficient quantities to short-circuit these windings.

In one form of submersible motor which we have found to be very successful in commercial operation we provide a motor chamber filled with a dielectric liquid, such as dry oil, in which the motor operates, this chamber being in open communication with one end of a balance chamber; the other end of this balance chamber being in open communication with the external liquid. This external liquid is usually water or some other conducting liquid and is of a density different from the density of the dielectric liquid whereby stratified and contacting bodies of the two liquids are present in the balance chamber, these bodies being in pressure-transferring relationship whereby the pressure inside the motor chamber is maintained equal to the pressure of the external liquid.

Such a structure is shown and claimed in our co-pending application Serial 114,414, filed June 8, 1926, in which application we also disclosed an oil-supply pipe extending to a point above the external liquid and opening on the motor chamber to supply dielectric liquid thereto. This supply pipe also acts as a storage chamber, and the dielectric liquid extends therein at a level close to the surface level of the external liquid in which the motor is submerged, being maintained in this position due to the balance of pressures in the balance chamber. Additional dielectric liquid can thus be supplied to the motor chamber by dropping or flowing this liquid into the supply pipe or an equivalent supply means, this additional supply of dielectric lowering the surface of contact of the two liquids in the balance chamber a small amount, thus forcing a corresponding amount of external liquid from the balance chamber.

It is an object of this invention to provide a control means for such a system which is operable when a predetermined amount of external liquid has entered the balance chamber.

A further object of the invention is to provide such a control means which controls the changing of the pressure in the balance chamber as a function of the amount of external liquid therein.

Still another object of the invention is to provide a system wherein the motor is de-energized should an excessive amount of external liquid enter the balance chamber.

Such a control system may conveniently include one or more electrodes extending into the dielectric liquid of the balance chamber so as to be contacted by the rising surface of the body of external liquid therein to complete a control circuit, and it is an object of this invention to provide such an electrode system in combination with a submersible structure.

Still another object of the invention is to provide a control or indicating means operative as a function of the conductivity of the dielectric liquid around the motor whereby the presence of any conducting material in the dielectric material can be detected, and if desired, used to control the motor or certain accessories of the system.

Another object of the invention is to provide a novel device for detecting the presence of such a conducting material.

Another object of the invention is to provide a system utilizing the conductors supplying current to the motor for control purposes, and to provide such a system in which the unbalance of any phase of the motor circuit is measured and used for control purposes.

It is not to be understood that our invention is limited to the use of a submersible motor, as distinguished from certain other submersible structures, but for the purpose of illustration we have shown our system in combination with a submersible motor without limiting ourselves thereto.

Thus, referring to the drawings,—

Figs. 3, 4, and 5 are wiring diagrams of alternative forms of control systems.

Figure 1:
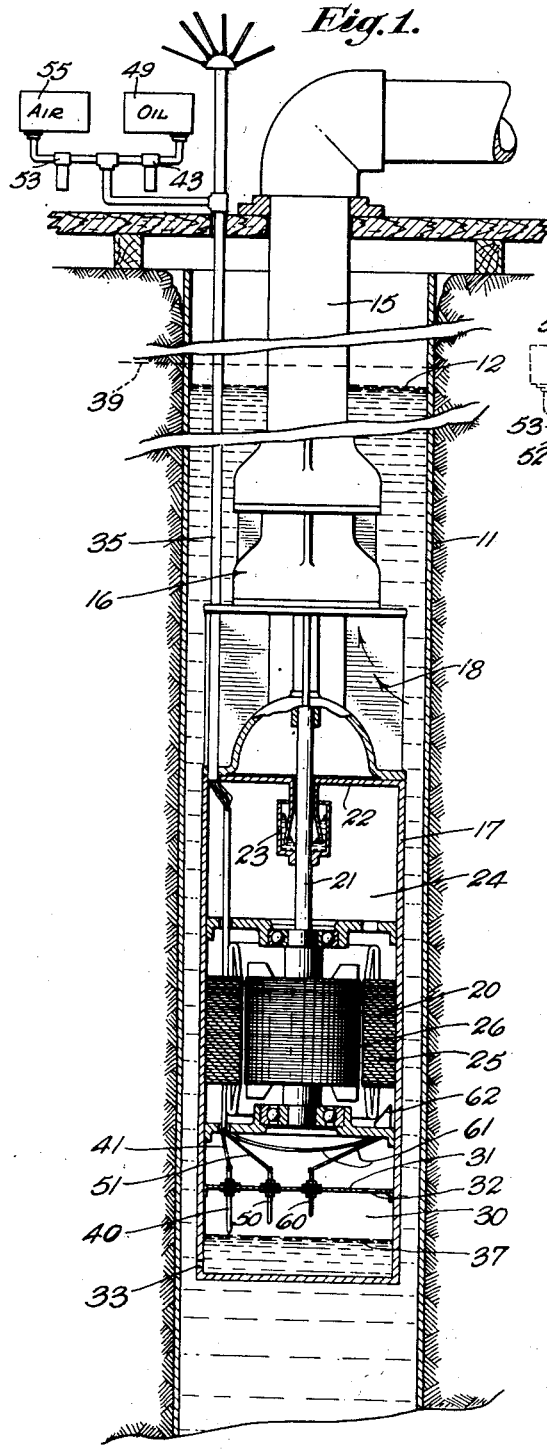
Fig. 1 illustrates a submersible motor pump unit installed in a well and incorporating certain of the control devices of our invention.

Referring particularly to Fig. 1 we have illustrated a well casing 11 positioned in a well filled with water or other external liquid to a level indicated by the numeral 12. Supported in the well by a discharge pipe 15 extending downward therein is a pump unit 16 to the lower end of which is secured a motor shell 17, both the pump unit and the motor shell being below the surface 12. This pump unit may be of a conventional turbine type, drawing external liquid thereinto, as indicated by the arrows 18, and discharging this liquid upward through the discharge pipe 15. A motor 20 drives the runners of the pump unit 16 through a shaft 21 extending through a wall 22 of the motor shell 17 and is sealed relative thereto by a suitable sealing device 23. This sealing device is preferably of the mercury-sealed type, but is per se no part of the present invention, being claimed in our co-pending application Serial No. 544,792, filed June 16, 1931, and could be replaced by any seal which effectively prevents water from entering the motor shell 17 at the junction of the shaft 21 and the wall 22. The motor 20 is positioned in a motor chamber 24 of the motor shell 17 and comprises the usual stator 25 and rotor 26, the latter being journalled in suitable bearings, such as those illustrated.

A balance chamber 30 is formed in the lower end of the motor shell 17, the upper end of this chamber being defined by a baffle 31 extending thereacross. This baffle includes one or more openings 32 which communicate between the motor chamber 24 and the upper end of the balance chamber 30. The lower end of this balance chamber is in open communication with the external liquid in the well through an opening 33 or other equivalent means.

In open communication with the interior of the motor shell 17, and thus in open communication with the motor chamber 24 and the upper end of the balance chamber 30 is a pipe 35 which extends upward to the surface of the ground, this pipe carrying the conductors supplying the current to the motor and also the control conductors to be hereinafter described, these conductors being of such diameter as to not completely fill the pipe 35 so that the space around these conductors is open.

The upper end of the balance chamber and the motor chamber 24 are filled with a dielectric medium such as dry oil. The balance chamber 30 thus contains pressure-equalized bodies of the dielectric medium and the external liquid, these bodies being in contact at a surface 37. Due to the equalization of pressures between the dielectric medium and the external liquid, the dielectric medium extends in the pipe 35 to a level 39. The level 39 is usually slightly higher than the level 12 due to a difference in density between the dielectric medium and the external liquid, the former being usually of less density than the latter.

As disclosed in our co-pending application supra, this system is very advantageous for it forms a dynamic system wherein the internal and external pressures on the shell 17 are always maintained equal regardless of the position of the water level 12. Thus, when the pump unit 16 is put into operation the water level 12 drops, thus lowering the pressure on the external liquid in the balance chamber 30, and thus correspondingly lowering the level 39 of the dielectric medium in the pipe 35. A corresponding amount of external liquid is forced through the opening 33. Due to the great difference in effective diameter between the balance chamber 30 and the pipe 35, the level 39 can change over wide limits, the corresponding movement of the surface 37 in the balance chamber being slight.

If, however, any leakage of dielectric medium from the motor chamber takes place, or if a sufficient amount of dielectric is not supplied to the motor chamber in the first place, it is possible that the surface 37 may rise to such a point as to allow external liquid to pass through the opening 32 and thus eventually into contact with the windings of the motor 20. This would, of course, short-circuit these windings and necessitate the renewal thereof after the motor pump unit had been removed from the well. In fact, the amount of water necessary to cause failure of these windings is extremely minute, and tests have indicated that one part of water in 10,000 parts of dielectric medium is sufficient to cause such short-circuiting. It is thus essential that none of the external liquid come into contact with the windings and this requires that none of this external liquid come into contact with any circulation set up in the dielectric medium which might draw the external liquid into contact with the motor winding.

The surface 37 may, of course, be lowered at any time by pouring an additional supply of dielectric medium into the upper end of the pipe 35, this additional supply forcing the surface 37 downward and at the same time maintaining the equalization of pressures in the system. It is, however, desirable that this supply of dielectric medium, hereinafter referred to as oil for purposes of definiteness and illustration, be accomplished automatically, and in Figs. 1 and 2 we have shown a system wherein this may be accomplished. In accomplishing this result it is necessary to provide some means operating as a function of the amount of external liquid in the balance chamber 30, and in Figs. 1 and 2 we have illustrated this means as comprising an electrode 40 extending downward through an insulator from the baffle 31. A conductor 41 is connected to this electrode and extends upward to the surface of the ground through the pipe 35, being connected to one terminal of a solenoid 42 associated with a magnetic valve 43, the other terminal of this solenoid being connected by a conductor 44 to a conductor 45 of a three-phase supply line including conductors 46 and 47, the latter conductor being grounded as indicated by the numeral 48. When the surface 37 comes in contact with the electrode 40 a circuit is thus completed through the conductor 47 through ground, through the body of external liquid in the balance chamber, and through the electrode 40, conductor 41, the solenoid 42, and the conductor 44.

This energizes the solenoid and opens the valve 43 to allow oil to move downward in the pipe 35 from an oil-supply tank 49. This supply of oil continues until the surface 37 is lowered from the electrode 40 at which time the circuit through the solenoid 42 is broken and the valve 43 again closes.

Figure 2:
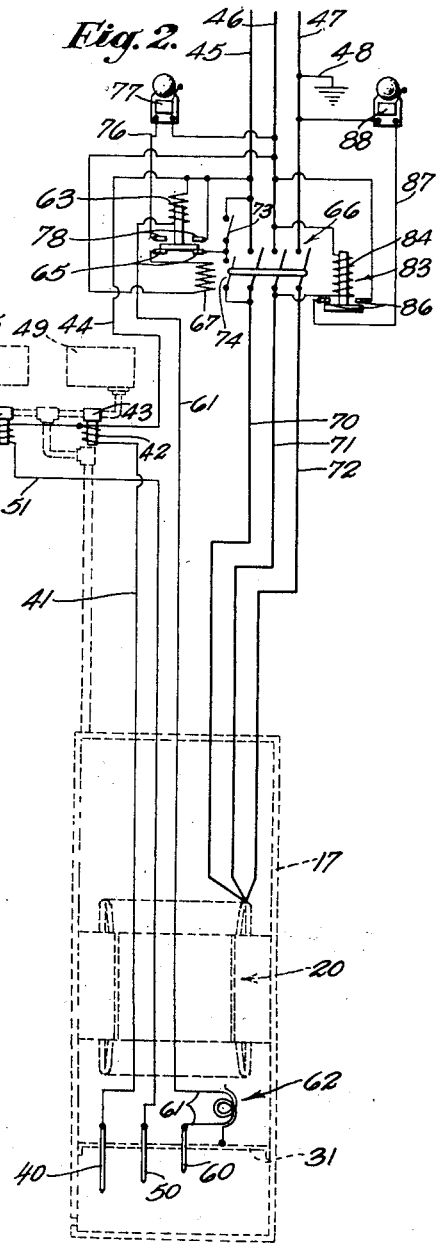
Fig. 2 is a wiring diagram of the apparatus illustrated in Fig. 1.

In the event that the oil-supply tank 49 should be dry, or in the event that the valve 43 did not function, it would be desirable to lower the surface 37 by other means. To accomplish this end we position a second electrode 50 in the balance chamber and connect this second electrode to a conductor 51 which extends upward and is connected to one terminal of a solenoid 52 of a magnetic valve 53, the other terminal being connected to the conductor 44, as shown in Fig. 2. The valve 53 controls the supply of air from an air-storage means 55 to the pipe 35. Thus, if the surface 37 comes into contact with the electrode 50, a circuit is completed from the conductor 47 through the body of external liquid in the balance chamber and through the electrode 50, conductor 51, solenoid 52, and conductor 44, thereby opening the magnetic valve 53, and allowing compressed air from the air-storage means to be introduced into the pipe 35. This forces the level of the dielectric medium in the pipe 35 downward. As soon as the surface 37 breaks contact with the electrode 50, however, the valve 53 closes.

Should the level 37 continue to rise, however, due to a failure of both the air and oil supply, it is desirable to automatically de-energize the motor. This is accomplished by an electrode 60 extending into the balance chamber a distance less than the electrodes 40 and 50. A conductor 61 is connected to the electrode and extends through a structure responsive to the amount of external liquid contaminating the dielectric medium, this structure being hereinafter termed a moisture-indicating relay 62, positioned in the motor chamber preferably adjacent the stator winding. This conductor 61 extends upward to the surface of the ground through the pipe 35, being connected to one terminal of a solenoid 63, the other terminal thereof being connected to the conductor 45. The solenoid 63 is associated with a relay providing contacts 65 which form a part of a holding circuit for a main switch 66, this holding circuit also including a holding coil or solenoid 67 of the usual construction, this holding circuit being of a conventional type whereby energization of the solenoid 67 closes and maintains closed the main switch 66, thus supplying current from the conductors 45, 46, and 47 to intermediate conductors 70, 71, and 72 extending downward through the pipe 35 and being connected to the stator winding.

In Fig. 2 we have shown one holding circuit including a starting switch 73, one terminal of which is connected to the conductor 45, and the other terminal of which is connected to an auxiliary switch 74 and to one of the relay contacts 65. Closing the switch 73 sends current from the conductor 45 through these relay contacts and through the solenoid 67 to the conductor 46, thus closing the main switch 66. As soon as this switch is closed the auxiliary switch 74 is likewise closed and when the starting switch 73 is opened the holding circuit of the switch is maintained by current passing through the main switch and through the auxiliary switch from the conductor 70, the current returning to the conductor 46 through the relay contacts 65 and the holding coil 67, as previously described. Should the level 37 come into contact with the electrode 60 a circuit will be completed from the conductor 47 through the body of external liquid in the balance chamber and through this electrode, the conductor 61, and the solenoid 63, to the conductor 45. This energizes the solenoid 63 and opens the relay contacts 65. This de-energizes the holding circuit of the main switch 66 and allows this switch to move into open position shown in Fig. 2.

In addition, however, it is sometimes desirable to close an alarm circuit 76 including a bell 77 or other indicating means when this condition occurs, and in accomplishing this end we utilize contacts 78 on the relay, which contacts are closed when the solenoid 63 is energized, thus completing a circuit from the conductor 45 through the contacts 78 and through the circuit 76 and the bell 77, the current returning to the conductor 46. The attention of the operator is at once called to this condition, and should he attempt to start the motor by closing the starting switch 73, no harm will result in view of the fact that the holding circuit of the switch cannot be closed due to the relay opening the contacts 65.

The moisture-indicating relay 62 is also capable of shutting down the motor should a sufficient amount of moisture enter the dielectric medium adjacent the windings to detrimentally affect these windings. This moisture-indicating relay is of very simple construction, but one which we have found to be extremely sensitive, so sensitive that the small moisture content of one's breath is sufficient to operate it. In practice we form this relay by utilizing two cotton covered conductors twisted together so as to be insulated from each other only by the cotton covering. One of these conductors is connected in series with the conductor 61 and thus forms a part thereof, while one end of the other of these conductors is grounded to some portion of the motor shell 17, the other end of this other conductor being free. The cotton covering on these conductors has an affinity for any moisture present in the oil, and any moisture reaching this insulation tends to short-circuit the two conductors of the moisture-indicating relay. There is normally impressed between these conductors a potential equal to the potential between the conductors 47 and 45, the former being connected to one conductor and the latter being connected to the other through the conductor 61 and the solenoid 63. Any moisture which thus exists in the dielectric adjacent the windings tends to decrease the resistance between the two conductors of the moisture-indicating relay, thus tending to send current through the solenoid 63. If this current becomes sufficiently large to operate the solenoid, the contacts 65 will open and the solenoid 67 will be immediately de-energized and cannot again be energized until a new supply of dielectric medium is forced down the pipe 35 in sufficient quantities to replace the existing contaminating dielectric, and until the moisture content of the cotton-covered insulation is decreased. This decrease in moisture content is in some instances automatically effected due to the heating action of the current passing between the two conductors of the moisture-indicating relay 62. In other instances it is necessary to force an auxiliary current therethrough to effect this drying action, or in extreme instances to remove the motor-pump unit from the well. It is not, however, necessary that we use cotton as an insulating medium though this type of relay has been found to be both cheap and effective in actual practice. Other types of insulating medium may also be utilized, or in some instances the relay may comprise two plates separated from each other by an insulating material having an affinity for water or merely separated by a quantity of the liquid dielectric in the motor shell. If this liquid dielectric becomes contaminated a current-flow will take place between the plates and the motor will be de-energized. Various systems for thus decreasing the moisture content of the oil and for utilization of other insulating media or electrodes are shown and claimed in our co-pending application Serial No. 741,796 a continuation in part of the present application, that application also containing claims on certain of the embodiments of the invention herein disclosed but not specifically claimed.

If the motor pump is not used for long periods of time, it is conceivable that through some adverse condition the dielectric medium may become contaminated with the external liquid to such an extent that to start the motor would be detrimental. The moisture-indicating relay will usually take care of such a situation, but in the event that such a relay is not used or in the event that it becomes temporarily inoperative we prefer to utilize an auxiliary relay 83 providing a solenoid winding 84 connected between the conductors 46 and 71, and around the main switch 66. This relay provides contacts 86 which are closed when the solenoid 84 is energized, thus closing an alarm circuit 87 including a bell or other alarm means 88. Assuming that the dielectric medium becomes contaminated around the motor windings it will at once be apparent that current will flow from the switch 66 through the solenoid 84 and through the conductor 71 to the motor winding. If the amount of moisture has become sufficient to carry a minute amount of current from any phase of the motor winding to ground, current will flow from the conductor 71 and will return through the grounded motor shell 17 to the conductor 47, thus energizing the solenoid 84 and closing the alarm circuit.

In Fig. 3 we have shown the solenoid winding 84 of the auxiliary relay 83 as being associated with the relay in the holding circuit so that energization of the solenoid 84 will make it impossible to start the motor even though the starting switch 73 is depressed. In accomplishing this end the pallet of the relay in the holding circuit has an extension 90 on which a magnetic core 91 is positioned, this core being acted upon by the solenoid 84. A magnetic core 92 is acted upon by the solenoid 63. Both the solenoid 63 and the solenoid 84 tend when energized to raise the plunger of the relay thereby opening the holding circuit. By this means it becomes impossible to start the motor if the relay in the circuit opens the contacts 65 either because the surface 37 is raised to contact the electrode 60 or because a circuit has been completed through the solenoid 84 due to a current passing from the winding of the stator to the ground shell as previously described. Thus, the system shown in Fig. 3 eliminates the use of an auxiliary alarm circuit 87.

In Fig. 4 we have shown still another system which is much simpler than the system shown in Fig. 2. In this system only a single electrode is used, this electrode being indicated by the numeral 100, and being connected to a conductor 101 in the usual manner, this conductor carrying current through a solenoid winding 102 of a magnetic valve 103 operating on an oil-supply tank 104 in the manner previously described. The remaining terminal of the solenoid 102 is connected to a conductor 105 which in turn extends to one terminal of a solenoid 107, the other terminal being connected by a conductor 108 to the conductor 45 of the supply line.

Thus, when the surface 37 comes in contact with the electrode 100, the solenoid 102 and the solenoid 107 are simultaneously energized and remain energized until the surface 37 moves out of contact with the electrode 100. The energizing of the solenoid 102 opens the valve 103 and allows oil to be supplied through the oil pipe, as previously described. The energizing of the solenoid 107 exerts a force on a plunger 110, this rightward movement being opposed by the action of a dash pot 111 which may be of any desired construction. So long as this solenoid 107 remains energized, however, the plunger 110 moves slowly to the right and after a predetermined length of time a pallet 112 on the plunger bridges contacts 113, thus completing a circuit from the conductor 45 through the solenoid 68 of the relay associated with the holding circuit, the current returning to the conductor 46 of the supply line. This, of course, opens the main switch and deenergizes the motor.

The essence of the invention shown in Fig. 4 lies in the fact that if the oil supplied through the oil pipe does not lower the surface 37 within a predetermined time, the time-limit relay will de-energize the motor. If, subsequently, the level 37 is lowered from the electrode 100 the motor will not automatically start in view of the fact that the main switch is open and current cannot thus flow through the auxiliary switch 74. The system can, however, be set into operation by closing the starting switch 73 in the usual manner. The time-limit relay disclosed in Fig. 4 is, of course, diagrammatic and other forms of time-operated switches may be utilized.

In Fig. 5 we have illustrated a system wherein no auxiliary control wires are necessary, the only wires extending through the pipe 35 being the conductors 70, 71, and 72. In this form of the invention we provide an electrode 120 connected to a conductor 121 which is connected to the conductor 70 in the motor chamber. Each of the conductors 70, 71, and 72 has associated therewith a current transformer, and the object of the system shown in Fig. 5 is to de-energize the motor when the current in the phases becomes unbalanced. This will, of course, take place when the surface 37 contacts the electrode 120, at which time the current in the conductor 70 is increased due to a circuit being formed from the conductor 47 through the body of external liquid in the balance chamber and through the electrode 120 and the conductor 121.

Any relay system may be utilized for determining when such an unbalanced condition exists. In Fig. 5 we have shown one system, indicating the current transformers associated with the conductors 70, 71, and 72 by the numerals 130, 131, and 132 respectively. These current transformers are connected to solenoids 135, 136, and 137 respectively, which are disposed 120° apart, the inner faces of which are spaced from each other as diagrammatically shown in Fig. 5. Extending between these inner faces is an armature 140 which has been shown as being triangular in shape. As shown to the left in Fig. 5, this triangle-shaped armature 140 is connected to a ball 141 journalled in a socket 142. Extending from this ball is a support 143 which normally engages the lower end of a plunger 144 of an auxiliary relay 145 including contacts 146 forming a part of the holding circuit of the main switch. The contacts 146 are normally closed by a pallet 147 associated with the plunger 144, but if the support 143 is moved to one side, as indicated by the dotted line 148, the plunger 144 will drop, thus breaking the holding circuit of the switch 66. Such a movement of the support 143 takes place when the triangle-shaped armature 140 is moved from its central position with relation to the solenoids 135, 136, and 137. Normally, when the three phases of the system are balanced the armature 140 will be spaced equally from each of the solenoids. If, however, the current through the conductor 70 becomes greater than the current through the conductors 71 or 72, for instance, the solenoid 135 will exert a greater pull on the armature 140 and will draw this armature toward the core of this solenoid, thereby moving the support 143 into its dotted line position 148 and thereby allowing the plunger 144 to drop to de-energize the holding circuit. This at once de-energizes the motor and the motor cannot be again energized until the auxiliary relay 145 is manually reset.

It should be understood that both the dielectric-supply means and the air-supply means shown in Figs. 1, 2, and 3 constitute a means for increasing the pressure in the balance chamber sufficient to move the level 37, even though this increase in pressure be temporary, and that each of these means is operative as a function of the amount of external liquid in the balance chamber. It is not necessary that both of these systems be utilized. In many installations we install only the oil-supply means and the electrode 60 for de-energizing the motor. In still other installations it is possible to dispense entirely with the automatic means for supplying dielectric medium or air to the balance chamber, and utilize only the electrode 60 for de-energizing the motor should the surface 37 come into contact with this electrode. So also certain other control systems herein disclosed are novel in themselves and are not necessarily used with the other apparatus shown in conjunction therewith. The particular apparatus illustrated has been shown only diagrammatically, and other types of apparatus will be at once apparent to those skilled in the art.

Our copending application Serial Number 231,513 contains dominating claims on an upward-extending pipe with a means for closing the upper end thereof.

We claim as our invention:

1. In combination with a structure submerged in an external liquid and providing a chamber containing variable amounts of said external liquid: a plurality of pressure-varying means above the surface of said external liquid and individually controlling the pressure in said structure to control the amount of said external liquid in said chamber; a plurality of electrode means extending varying distances into said chamber toward said surface of said external liquid; and circuit means operatively connecting each of said electrode means to a corresponding pressure-varying means.

2. In combination with a structure submerged in an external liquid providing a chamber to which the external liquid has access and to which an internal liquid is supplied by a supply means to control the amount of said external liquid in said chamber: storage means for introducing said internal liquid into said supply means; valve means controlling the flow from said storage means into said supply means; and means controlled by the relative amounts of said internal and external liquids in said chamber for controlling said valve means.

3. In combination in a submersible motor structure: a shell containing an electric motor surrounded by a dielectric medium, said shell being submerged in an external liquid which would be injurious to said motor should it come in contact therewith; means positioned in said dielectric medium which surrounds said electric motor and responsive to the presence of minute amounts of said external liquid which might become associated with said dielectric medium; and means at a point above the surface of said external liquid and operating in response to changes in said last-named means whereby the presence of such amounts of said external liquid in said dielectric medium as would be injurious to said motor may be detected.

4. In combination in a submersible motor structure: a shell containing an electric motor surrounded by a dielectric medium, said shell being submerged in an external liquid which would be injurious to said motor should it come in contact therewith; supply means for energizing said electric motor; means positioned in said dielectric medium in said shell and responsive to the presence of minute amounts of said external liquid which might become associated with said dielectric medium; and means cooperating with said last-named means for disconnecting said supply means from said electric motor when the amount of said external liquid associated with said dielectric medium becomes large enough to detrimentally affect the operation of said motor.

5. In combination in a submersible motor structure: a shell containing an electric motor surrounded by a dielectric medium, said shell being submerged in an external liquid which would be injurious to said motor should it come in contact therewith: a pair of adjacent electric conductors positioned in said dielectric medium and spaced from each other by an insulating medium which in the presence of said external liquid becomes a conductor; a circuit for impressing a difference of potential between said conductors; and current-responsive means associated with said circuit for detecting an increased current flowing through said circuit when a minute quantity of said external liquid becomes associated with said dielectric medium.

6. A combination as defined in claim 5 including a chamber in said shell to which said external liquid has access, and including an electrode extending into said chamber to be contacted by said external liquid when excessive amounts thereof enter therein, said electrode being connected to one of said conductors.

7. In combination in a submersible motor structure: an electric motor; a shell enclosing said electric motor and submerged in an external liquid which would be injurious to said motor should it come in contact therewith; walls defining a chamber communicating with the space around said motor and having access to said external liquid; means for increasing the pressure in said chamber to force at least a portion of said external liquid therefrom; means responsive to the amount of said external liquid in said chamber for controlling said first-named means; and auxiliary means for de-energizing said electric motor should said first-named means fail to function.

8. In a submersible structure, the combination of: a submerged motor structure including a shell submerged in a conducting liquid and providing a chamber containing a dielectric liquid, and including an electric motor in said shell; means communicating between said chamber and said conducting liquid whereby conducting liquid may reach said chamber, said conducting liquid and said dielectric liquid stratifying in said chamber to form liquid bodies; electrode means extending in said body of dielectric liquid in said chamber and toward said body of conducting liquid whereby an increase in the amount of said conducting liquid in said chamber brings said conducting liquid into contact with said electrode means; an electric circuit including said electrode means and said body of conducting liquid in said chamber, the current through said electric circuit changing when said body of conducting liquid contacts said electrode means; and control means above the surface of said conducting liquid associated with said submerged motor structure and connected to said circuit means to be responsive to changes in current in said circuit.

9. In combination: a structure submerged in an external liquid and containing a dielectric liquid, said structure providing a chamber communicating with said external liquid and containing bodies of both said external liquid and said dielectric liquid; means for supplying additional dielectric liquid to said structure to control the amount of said external liquid in said chamber; and means controlled by the amount of said external liquid in said chamber for controlling said first-named means.

10. In combination in a submersible motor structure: a motor including a winding; a shell around said motor and submerged in a conducting liquid; potential-supply conductors one of which is grounded; switch means connected to said potential-supply conductors; intermediate conductors electrically connecting said switch means and said winding whereby closing of said switch means energizes said winding, one of said intermediate conductors being connected to and grounded through said shell; a coil connected around said switch means from one non-grounded potential-supply conductor to one non-grounded intermediate conductor whereby current will flow through said coil should the conducting liquid form a current-conducting path between said winding of said motor and said shell.

11. A combination as defined in claim 10 in which said switch means includes a holding circuit, and including a control switch for completing said holding circuit, and including means associated with said control switch and said coil for opening said switch means to de-energize said winding when said coil is energized.

12. In a submersible structure, the combination of: a shell submerged in a conducting liquid and providing a chamber containing a dielectric liquid; means communicating between said chamber and said conducting liquid whereby conducting liquid may reach said chamber, said conducting liquid and said dielectric liquid stratifying in said chamber to form liquid bodies; storage means above the surface of said conducting liquid for supplying said dielectric liquid to said chamber, thereby controlling the amount of said conducting liquid in said chamber; electrode means in said chamber and positioned to be contacted by said body of conducting liquid therein; an electric circuit including said electrode means, the current through said electric circuit changing when said body of conducting liquid contacts said electrode means; and means operated by said change in current in said electric circuit for controlling the flow of said dielectric liquid to said chamber.

13. In a submersible motor structure, the combination of: a structure submerged in an external liquid and containing a dielectric liquid, said structure providing a chamber communicating with said external liquid and with said dielectric liquid to contain bodies of these liquids; supply means for increasing the pressure in said structure; means in said chamber and cooperating with said supply means for increasing the pressure in said structure when a predetermined amount of said external liquid enters said chamber; an electric motor in said structure; and auxiliary means in said chamber for de-energizing said electric motor should more than said predetermined amount of said external liquid enter said chamber.

14. In a submersible motor structure, the combination of: a motor shell submerged in an external liquid and containing a body of dielectric liquid; a motor in said shell; current supply means for supplying current to said motor; a pipe in open communication with the interior of said motor shell and extending upward to a point above the surface of said external liquid and containing a body of said dielectric liquid developing a pressure in said motor shell which is at least as great as the pressure of said external liquid in which said motor shell is submerged; and an electrically operated valve means electrically connected to said current supply means and through which dielectric liquid is supplied to said motor shell through said pipe.

15. In combination: a submerged motor structure including a motor shell and an electric motor therein, said motor shell containing a dielectric liquid and being submerged beneath the surface of an external liquid in a well; electric means in said motor shell and responsive to the amount of external liquid in said shell; conductor means electrically connected to said electric means and extending upward to the top of said well; a winding at the top of said well and connected to said conductor means to be energized therethrough when excessive amounts of said external liquid enter said shell; and control means operated by the energization of said winding for controlling said submerged motor structure.

16. In combination: a submerged motor structure including a motor shell and an electric motor therein, said motor shell containing a dielectric liquid and being submerged beneath the surface of an external liquid; a pipe communicating with said dielectric liquid in said motor shell and extending upward from said motor shell; valve means for closing the upper end of said pipe; walls defining a balance chamber communicating with said dielectric liquid and with said external liquid to contain pressure-transferring bodies of said liquids, any increase in pressure of said external liquid being thus transmitted to said dielectric liquid to force an additional quantity of said dielectric liquid upward in said pipe; and means responsive to the conditions existing in said submerged motor structure for actuating said valve means.

17. In combination: a submerged motor structure including a motor shell and an electric motor therein, said motor shell containing a dielectric liquid and being submerged beneath the surface of an external liquid; a pipe means extending upward from said motor shell and communicating therewith, said pipe means containing a body of said dielectric liquid and extending upward to a point above the surface of said external liquid; electric means in said motor shell and operating in response to the amount of said external liquid in said motor shell; conductor means extending upward to a point above said surface of said external liquid; and means above the surface of said external liquid and electrically connected to said conductor means for indicating when the amount of said external liquid in said motor shell becomes excessive.

18. A combination as defined in claim 14 in which said valve means is positioned above the surface of said external liquid and at the upper end of said pipe.

19. In combination: a shell containing a dielectric liquid and submerged in a conducting liquid; a motor in said shell; a potential-supply means; a magnetic switch electrically connecting said potential-supply means and said motor, said switch including a winding the energization of which controls the opening and closing thereof; and means for opening said magnetic switch to de-energize said motor when an excess quantity of said conducting liquid enters said shell, said means including means in said shell responsive to the amount of conducting liquid therein and circuit means connecting said last-named means to said winding of said magnetic switch.

20. In combination: a submersible electric motor structure including a shell, a baffle means extending across said shell to divide the space inside said shell into a motor chamber and a balance chamber vertically disposed with respect to each other, and a motor in said motor chamber, said baffle means bounding an opening through which said motor chamber is in communication with said balance chamber, said motor chamber containing a dielectric liquid, said balance chamber containing contacting bodies of said dielectric liquid and a conducting liquid in which said shell is submerged, there being a passage communicating between said balance chamber and said conducting liquid in which said shell is submerged and through which additional quantities of said conducting liquid may enter said balance chamber to raise the surface of contact of said liquids therein; control means associated with said submersible electric motor structure; electrode means extending downward in said balance chamber to be contacted by said conducting liquid therein when said surface of contact rises sufficiently; and circuit means connecting said electrode means and said control means to actuate said control means when said surface of contact rises to contact said electrode means.

21. A combination as defined in claim 20 in which said balance chamber is below said motor chamber, and in which said electrode means depends downward from said baffle means, and including means insulating said electrode means from said baffle means.

22. In combination: a shell containing a dielectric liquid and having access to a conducting liquid tending to contaminate said dielectric liquid; circuit means extending into said shell; means operatively connected to said circuit means to be responsive to the amount of current flowing through said circuit means; and relay means in said shell and positioned in said dielectric liquid and responsive to the amount of said conducting liquid associated with said dielectric liquid, said relay means including a pair of conductors electrically connected to said circuit means but spaced from each other, and including a material between said conductors having an affinity for said conducting liquid whereby the contaminating conducting liquid in said dielectric liquid becomes associated with said material having an affinity therefor to change the current in said circuit means.

23. A combination as defined in claim 22 in which said pair of conductors comprises two wires in close proximity to each other and in which said material between said conductors and having an affinity for said conducting liquid comprises a layer of material bridging the entire distance between said conductors.

24. A combination as defined in claim 22 in which said pair of conductors comprises two wires twisted together, at least one wire being cotton-covered whereby the cotton covering forms said material having an affinity for said conducting liquid.

25. A combination as defined in claim 22 in which said circuit means includes a main conductor with ground return through the material forming said shell, and in which one of said pair of conductors is grounded to said shell and in which the other of said pair of conductors is connected to said main conductor.

26. In combination: a submersible structure including a shell containing a dielectric liquid and an electric means in said shell and surrounded by said dielectric liquid; circuit means extending into said shell; control means for said submersible structure and associated with said circuit means and operable in response to an increase in the current flowing in said circuit means; a moisture-responsive relay in said dielectric liquid in said shell and responsive to any small quantities of moisture which contaminate said dielectric liquid, said moisture-indicating relay including a pair of conductors electrically connected in said circuit and separated by a material having an affinity for moisture; potential-supply means associated with said circuit means for impressing a potential difference across said pair of conductors whereby the current flowing through said circuit means increases as the amount of moisture in said material increases.

27. In combination: a submersible structure including a shell containing stratified bodies of a dielectric liquid and a conducting liquid and containing electric means in said body of dielectric liquid; control means for said submersible structure; a first means responsive to the amount of said conducting liquid in said body of conducting liquid in said shell; a second means responsive to the amount of said conducting liquid contaminating said dielectric liquid forming said body of dielectric liquid in said shell; and connecting means operatively connecting said control means and both said first and second means whereby said control means is actuated in response to either the amount of conducting liquid in said body of conducting liquid or the amount of conducting liquid contaminating said dielectric liquid forming said body of dielectric liquid in said shell to protect said electric means in said shell.

28. A combination as defined in claim 27 in which said first means includes an electrode means in said body of dielectric liquid and adapted to be contacted by said body of conducting liquid when the quantity of said conducting liquid therein becomes excessive, and in which said second means includes a pair of conductors spaced from each other in said body of dielectric liquid, and in which said connecting means includes a conductor means connecting one of said pair of conductors of said second means in series circuit with said electrode means.

EARL MENDENHALL.
JUNIUS B. VAN HORN.